(12) United States Patent
Santander Cerbell

(10) Patent No.: US 7,580,196 B2
(45) Date of Patent: Aug. 25, 2009

(54) LIQUID SOLAR LENS

(76) Inventor: Roberto Santander Cerbell, C/ Rafael Mesa y Lopez, 60 2 C, Las Palmas de Gran Canaria (ES) 35012

( * ) Notice: Subject to any disclaimer, the term of this patent is extended or adjusted under 35 U.S.C. 154(b) by 10 days.

(21) Appl. No.: 11/791,977

(22) PCT Filed: Dec. 20, 2005

(86) PCT No.: PCT/ES2005/070180

§ 371 (c)(1),
(2), (4) Date: May 31, 2007

(87) PCT Pub. No.: WO2006/079671

PCT Pub. Date: Aug. 3, 2006

(65) Prior Publication Data

US 2008/0117522 A1    May 22, 2008

(30) Foreign Application Priority Data

Jan. 25, 2005    (ES)    ................. 200500134

(51) Int. Cl.
*G02B 1/06*    (2006.01)
*G02B 3/08*    (2006.01)

(52) U.S. Cl. ...................... 359/665; 359/742
(58) Field of Classification Search .......... 359/665, 359/742, 743; 136/243–265
See application file for complete search history.

(56) References Cited

U.S. PATENT DOCUMENTS

| | | | |
|---|---|---|---|
| 3,004,470 A | 10/1961 | Hans | |
| 6,483,093 B1 | 11/2002 | Takemura et al. | |
| 6,552,860 B1 * | 4/2003 | Alden | ............ 359/742 |
| 7,245,439 B2 * | 7/2007 | Kuiper et al. | ......... 359/665 |

FOREIGN PATENT DOCUMENTS

| | | |
|---|---|---|
| EP | 0 840 075 | 5/1998 |
| EP | 0 999 419 | 5/2000 |
| EP | 1 251 366 | 10/2002 |
| FR | 1 243 794 | 10/1960 |
| GB | 196312 | 4/1923 |

OTHER PUBLICATIONS

Patent Abstracts of Japan, vol. 001, No. 073 (E-029), Jul. 14, 1977 & JP 52 010151 A (Nanguchi Akira; others: 01), Jan. 26, 1977, abstract; figures 3,4.

* cited by examiner

*Primary Examiner*—Darryl J Collins
(74) *Attorney, Agent, or Firm*—Banner & Witcoff, Ltd.

(57) ABSTRACT

Formed by modules (1) with bi-convex (2) configurations in the central modules (1) of the lens, becoming plano-convex and finally concavo-convex in its end modules (1), with a smooth transition (3), all ridges or grooves being minimized, and with the vertical face joining the upper and lower facets of the modules (1) being flat and inclined towards the optical axis, eliminating spherical aberration by incorporating in the modules (1) refracting fluids with different refraction index and very small volume, in a construction with a minimal thickness and weight.

21 Claims, 4 Drawing Sheets

LIQUID SOLAR LENS

OBJECT OF THE INVENTION

The present invention relates to a lens for concentrating solar energy, characterised by a construction free of spherical and geometric aberration, as well as by being basically biconvex and consisting of several containers in which a refracting liquid is contained. This substantially flat lens has a shape and dimensions adapted to the predetermined focal length and type of focus, in order to minimise optical losses.

BACKGROUND OF THE INVENTION

The use of conventional lenses to capture solar energy has serious drawbacks, mainly due to their high cost and weight, which hinders the construction of large lenses for capturing great amounts of luminous solar power. In addition, a black body must be used to obtain a high yield from solar power, which requires an extremely high optical quality that cannot be obtained with ordinary lenses.

A black body in essence is a perfectly sealed and thermally insulated enclosure that prevents any internal heat from escaping, in which a small opening is made through which enters a light beam with the greatest possible intensity.

The Fresnel lens, invented in the early $19^{th}$ Century, is characterised by being a thin lens that can have a large size. It has reached our time without any improvement of its optical properties that would provide a concentration acceptable for its use as a solar energy concentrator of large dimensions and short focal length.

Each of the zones, rings or crowns conforming it is obtained from a section of a piano-convex lens and has the angle of curvature of the corresponding part of the aperture of the lens from which it is obtained, thereby conforming the Fresnel lens.

The Fresnel lens has a poor optical quality, large spherical aberration, great optical losses due to its morphology, great optical imprecision and a high cost. For these reasons, it is only used in applications where optical precision is not required. This limits its field of use considerably.

The experience gathered in the development of the modulated liquid lens without spherical aberration has allowed applying similar techniques for solving the serious drawbacks of the Fresnel lens.

DESCRIPTION OF THE INVENTION

The liquid solar lens is obtained by making a number of modifications and corrections in the Fresnel lens in order to solve its problems for concentrating solar energy. These problems are:

1. Cost and Weight

The high cost of the Fresnel lens is mainly due to its complex manufacturing process, as it is generally made of solid glass with a great weight.

This is solved by modulating the rings or facets of the Fresnel lens in small containers that hold a transparent, liquid, semi-liquid or solidifiable refracting fluid configuring each zone, ring or crown which together form the lens as a whole, thereby solving these drawbacks.

The construction of these containers involves a similar process to that used in the industry for manufacturing bottles and other vessels, for which moulding, injection, extrusion processes etc. are used, and several types of matrices for shaping them depending on whether they are circular or cylindrical.

2. Light Loss

Light losses in the Fresnel lens occur in its upper surface and amount to about 30% of the captured light.

These losses are due to the angle of the upper facets, to the fact that the upper curvature is eliminated and replaced by a flat segment, and to the rounding of the corners of the flat zones.

In order to minimise these losses the slope of the curvature of the upper facet of each longitudinal zone, ring or crown is gradually reduced so that the height of the corresponding steps is considerably reduced. This solution limits the related losses to 3% of total light captured.

3. Optical Quality and Aberrations

The low optical quality and aberrations of the Fresnel lens result in great scattering of the light captured about the theoretical focal point of the lens.

The following procedures allow overcoming these drawbacks:

a) Firstly, the flat bottom surface is replaced by curvature segments with different radius and slope in each zone, ring or crown, in order to obtain the appropriate deviation of each optic ray in a precise manner.

b) Secondly, the index of refraction of the fluid is changed in each zone ring or crown as required, so that the slope of the bottom curvature is as small as possible and therefore the thickness of the containers is reduced.

Both the radius of curvature of each upper and lower facet and the index of refraction must be calculated precisely for each zone, ring or crown so that the concentration at the focus is optimal.

The aforementioned modifications affect the classic structure of the Fresnel lens considerably, optimising its optical properties. The solar lens thereby obtained has the following advantages:

a) A very low production cost and low weight;
b) A loss of light energy due to reflection under 3%;
c) Perfect light convergence at the focal point, as the light rays can be directed with complete precision;
d) Elimination of spherical aberration with an optimal concentration factor;
e) A substantially flat shape, as the zones, rings or crowns composing it approximate a single horizontal plane.

The containers composing each zone, ring or crown of the circular liquid solar lens are identical to one another, with curved upper and lower facets that generate a circular focus. This type of lens is originated by projecting the curved segments on the flat base of a conventional plano-convex spherical lens.

The containers composing each linear zone of the rectangular liquid solar lens are identical to one another, with curved upper and lower facets that generate a linear focus. This type of lens is originated by projecting the curved segments on the flat base of a conventional piano-convex cylindrical lens.

The liquid solar lens adopts a double curvature in each one, ring or crown: a curvature in the upper part the radius of which can be the same for different zones, rings or crowns; and a lower curvature the radius of which will generally be different for each zone, ring or crown, and will depend on the distance from the optical axis and the index of refraction of the fluid of each zone, ring or crown; and a double step with respect to the horizontal plane, very small on the upper part to minimise light losses and larger on the bottom part for a perfect convergence of the sunlight.

DESCRIPTION OF THE DRAWINGS

The present descriptive memory is completed with a set of drawings that illustrate a preferred example and in no way limit the invention.

PREFERRED EMBODIMENT OF THE INVENTION

In view of the above, the present invention relates to a new liquid solar lens formed by several transparent containers in modules (1) with an appropriate geometry, constructed by processes used extensively in the industry such as injection, blowing, extrusion, moulding, rotating casting or other methods, using materials resistant to sunlight such as light, polycarbonate, methacrylate etc. by using the proper matrix in each case, essentially characterised by the modulability of the containers composing the various zones, crowns or rings of the lens, which can be self-supporting or provided with an additional supporting structure, allowing to construct large lenses.

These modules (1) are characterised by different containers (6), identical in each zone, crown or ring which in turn differ from the containers composing the remaining zones, rings or crowns in both their radius of curvature and in the slope of the curvature of their upper and lower facets.

Figure 1:
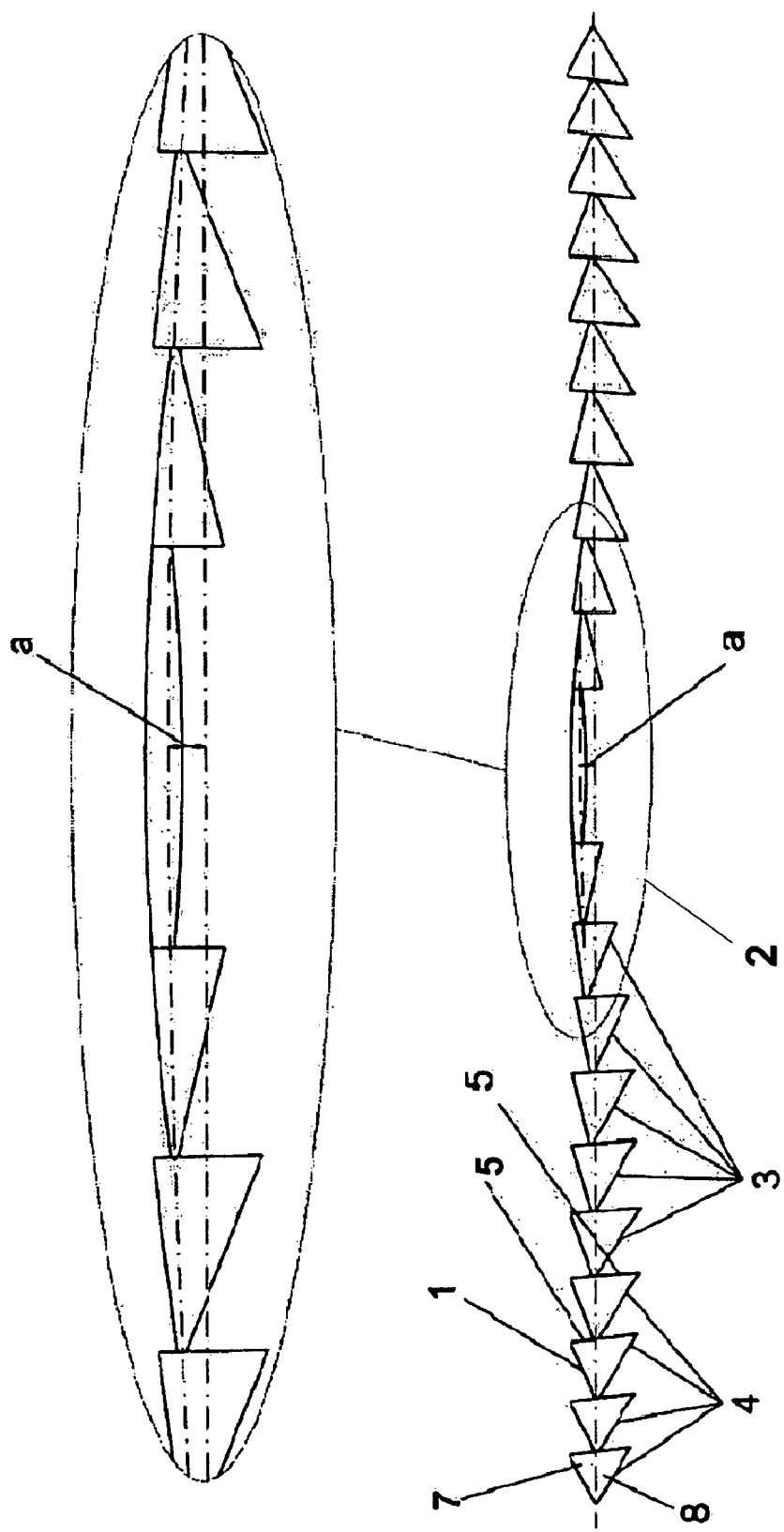
FIG. 1 is an elevation view of the liquid solar lens of the invention in its linear rectangular embodiment, showing its slight external convex curvature in which the bow (a) is determined by the height with respect to its theoretical flat position.
Figure 2:
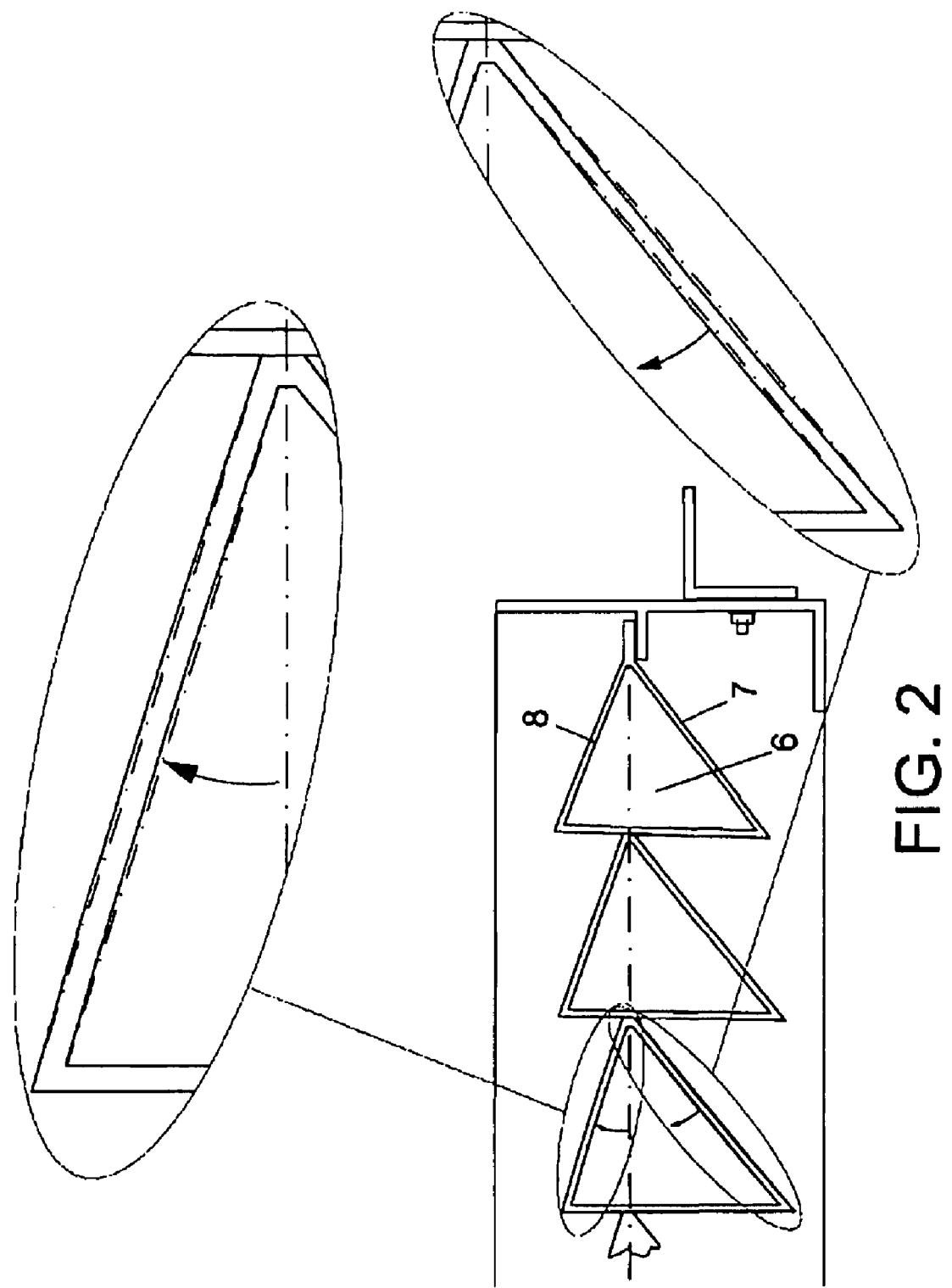
FIG. 2 is a cross section of the elevation of the lateral end of this linear rectangular lens wherein the upper facets of the modules have the upper facet convex and the lower facet is concave.
Figure 3:
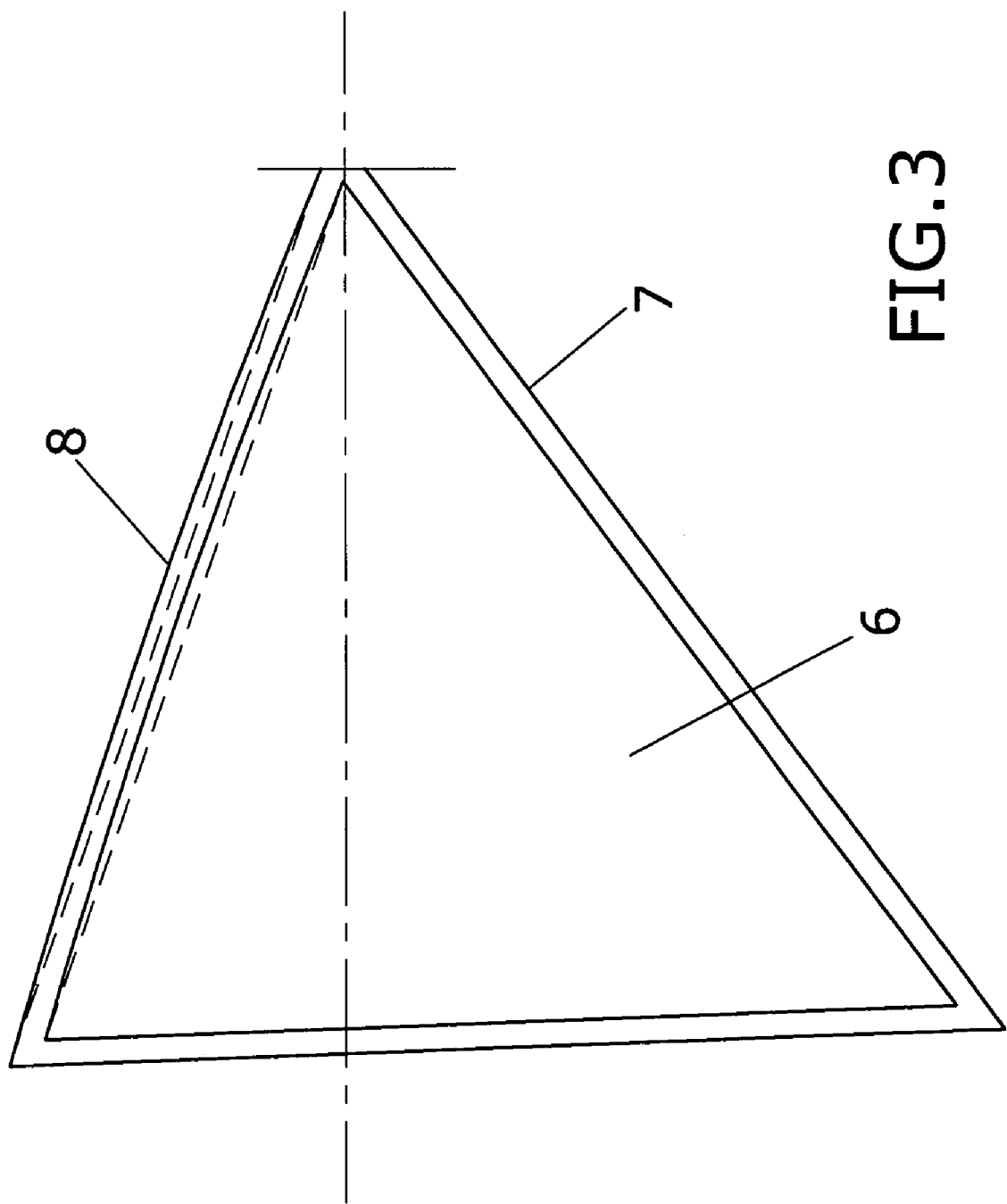
FIG. 3 shows a cross section of a container wherein can be appreciated how the upper facet of the container has its upper facet convex while the lower facet is planar.
Figure 4:
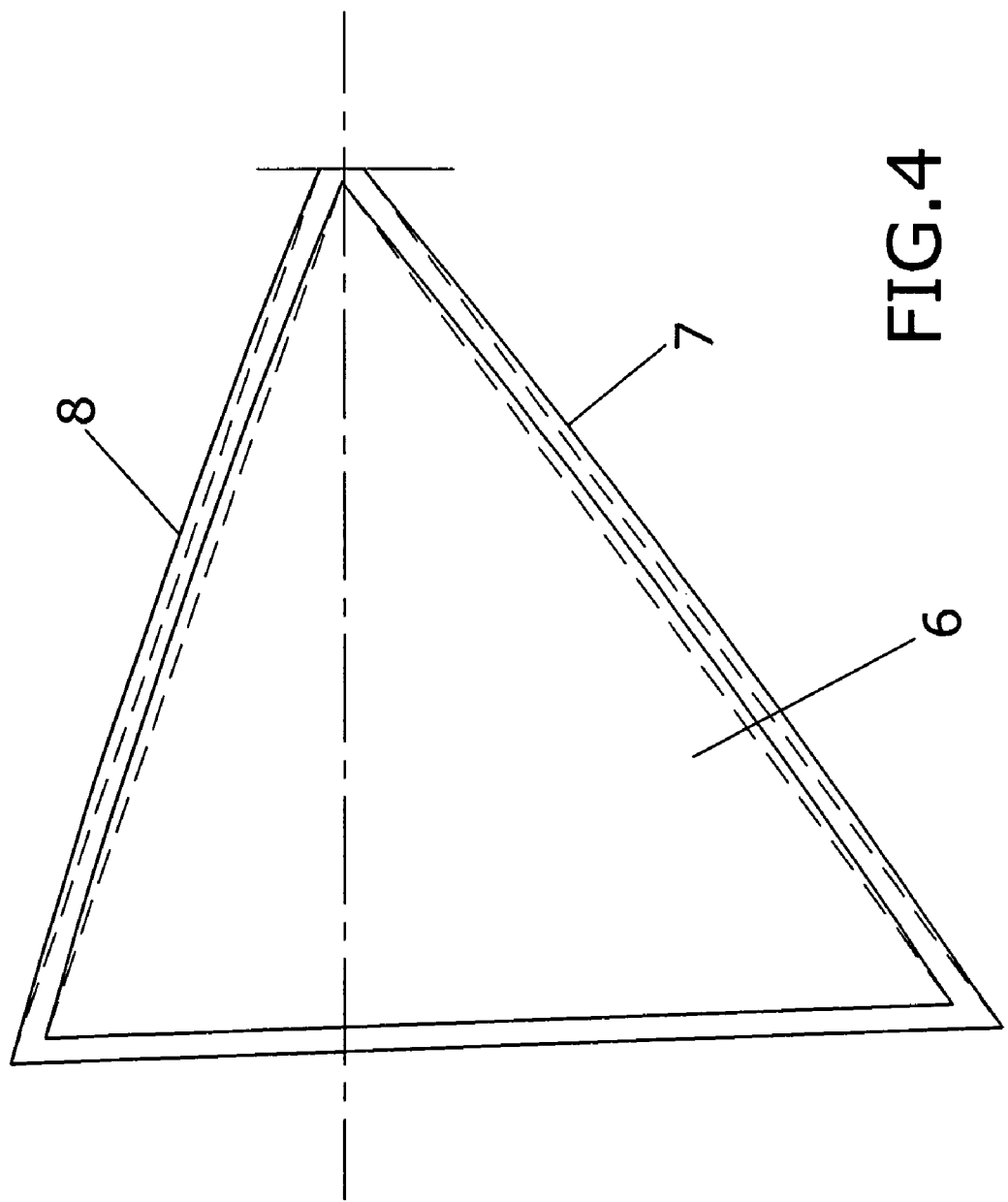
FIG. 4 shows a cross section of a container wherein can be appreciated how the upper facet of the container has its upper facet convex while the lower facet is convex.

FIGS. 2, 3 and 4 represents the different shapes adopted by the upper and lower facets of the containers of each module depending on where they are located in the lens, wherein the dash lines represents straight lines, while the continuous line represents the final shape.

It also characterises the zones, rings or crowns of the central modules (2) as having both the upper facet (8) and the lower facet (7) generally bi-convex (2), while the intermediate modules (3) they have the upper facet (8) convex and the lower facet (7) planar and the end modules (4) have the upper facet (8) convex while the lower facet (7) concave, wherein the radius of curvature of the lower facet (7) has a smooth transition, wherein the zones, rings or crowns must be non-deformable against the potential loads, said zones, rings or crowns disposed on a same almost horizontal plane.

The liquid solar lens is characterised in that the vertical face (5) of the containers that connects the upper (8) and lower facets (7) is flat and inclined towards the optical axis, following the trajectory of the sunlight in order to prevent light losses due to interference. In addition, to allow solar tracking by horizontal and vertical rotation, the supporting structure when present will be placed in optically neutral areas coinciding with the vertical faces, so that no additional power losses will occur.

It particularly characterises that the ridges or grooves formed by the facets of the Fresnel lens have been minimised by reducing the slope of the curve of each facet in this Fresnel lens, which has a number of structural modifications that provide a very high optical quality by replacing its flat lower surface with curved surfaces in each zone, ring or crown that allow a perfect convergence of the captured sunlight.

It characterises the elimination of spherical aberration by placing transparent fluids inside it with indices of refraction that increase gradually in each zone, ring or crown from the optical axis to the edges of the lens, providing a perfect concentration of the sunlight at the focus.

It also characterises the small volume of refracting fluid contained in each container, which allows a construction with a small thickness, thereby reducing costs and weight.

The essence of this invention is not affected by variations in the materials, shape, size and arrangement of its component elements, described in a non-limiting manner that should allow its reproduction by an expert.

The invention claimed is:

1. A Liquid solar lens, from among Fresnel lenses formed by several transparent containers constructed by injection, blowing, extrusion, moulding, rotating casting or other glass, polycarbonate, methacrylate, in a construction with a reduced thickness and weight, comprising:

Modules that are comprises as several containers that are identical in each zone, ring or crown by different from the modules composing the other zones, rings or crowns as regards their radius of curvature and the slope of the curvature of the upper and lower facets, with bi-convex configurations in the central modules of the lens, becoming plano-convex in the intermediate modules and finally concavo-convex in its end modules, with a transition of the radius of curvature of a lower facet, all of the modules non-deformable by the loads, said zones, rings or crowns being disposed on the same, plane with an outer convex curvature with a bow and all ridges or grooves minimised, a vertical face joining the upper and lower facets of the modules being flat and inclined towards the optical axis and, by the elimination of spherical aberration due to the incorporation in the modules of refracting fluids with different refraction index and very small volume.

2. A Liquid solar lens according to claim 1, wherein the modules are self supporting or have an additional supporting structure.

3. A liquid solar lens according to claim 2, the vertical face of the modules follows the trajectory of the sunlight, preventing light losses due to interference, and is provided with a supporting structure located at optically neutral areas coinciding with the vertical faces.

4. A liquid solar lens according to claim 2, in which to minimise the ridges or grooves the slope of the curve of each facet of the Fresnel lens is minimised.

5. A liquid solar lens according to claim 2, in which to eliminate spherical aberration the transparent fluids inside the modules increase in refractive index in each zone, ring or crown progressively from the optical axis to the edge of the lens.

6. A liquid solar lens according to claim 2, wherein the concavo-convex configurations of the end modules of the lens are replaced by plano-convex configurations.

7. A liquid solar lens according to claim 2, wherein the plano-convex and concavo-convex of the end modules of the lens are replaced by biconvex configurations.

8. A Liquid solar lens according to claim 1, the vertical face of the modules follows the trajectory of the sunlight, preventing light losses due to interference, and is provided with a supporting structure located at optically neutral areas coinciding with the vertical faces.

9. A liquid solar lens according to claim 8, in which to minimise the ridges or grooves the slope of the curve of each facet of the Fresnal lens is minimised.

10. A liquid solar lens according to claim 8, in which to eliminate spherical aberration the transparent fluids inside the modules increase in refractive index in each zone, ring or crown progressively from the optical axis to the edge of the lens.

11. A liquid solar lens according to claim 8, wherein the concavo-convex configurations of the end modules of the lens are replaced by piano-convex configurations.

12. A liquid solar lens according to claim 8, wherein the plano-convex and concavo-convex of the end modules of the lens are replaced by biconvex configurations.

13. A Liquid solar lens according to claim 1, in which to minimise the ridges or grooves the slope of the curve of each facet of the Fresnel lens is minimised.

14. A liquid solar lens according to claim 13, in which to eliminate spherical aberration the transparent fluids inside the modules increase in refractive index in each zone, ring or crown progressively from the optical axis to the edge of the lens.

15. A liquid solar lens according to claim 13, wherein the concavo-convex configurations of the end modules of the lens are replaced by plano-convex configurations.

16. A liquid solar lens according to claim 13, wherein the plano-convex and concavo-convex of the end modules of the lens are replaced by biconvex configurations.

17. A Liquid solar lens according to the claim 1, in which to eliminate spherical aberration the transparent fluids inside the modules increase in refractive index in each zone, ring or crown progressively from the optical axis to the edge of the lens.

18. A liquid solar lens according to claim 17, wherein the concavo-convex configuration of the end modules of the lens are replaced by plano-convex configurations.

19. A liquid solar lens according to claim 17, wherein the plano-convex and concavo-convex of the end modules of the lens are replaced by biconvex configurations.

20. A Liquid solar lens according to claim 1, wherein the concavo-convex configurations of the end modules of the lens are replaced by piano-convex configurations.

21. A Liquid solar lens according to claim 1, wherein the piano-convex and concavo-convex of the end modules of the lens are replaced by bi-convex configurations.

* * * * *